US008935700B2

(12) United States Patent
Michel et al.

(10) Patent No.: US 8,935,700 B2
(45) Date of Patent: *Jan. 13, 2015

(54) EFFICIENT LOCK HAND-OFF IN A SYMMETRIC MULTIPROCESSOR SYSTEM

(71) Applicant: International Business Machines Corporation, Armonk, NY (US)

(72) Inventors: Dirk Michel, Austin, TX (US); Bret R. Olszewski, Austin, TX (US); Basu Vaidyanathan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/105,347

(22) Filed: Dec. 13, 2013

(65) Prior Publication Data
US 2014/0101662 A1    Apr. 10, 2014

Related U.S. Application Data

(63) Continuation of application No. 13/426,293, filed on Mar. 21, 2012.

(51) Int. Cl.
G06F 9/46 (2006.01)
G06F 9/52 (2006.01)

(52) U.S. Cl.
CPC . G06F 9/52 (2013.01); G06F 9/526 (2013.01)
USPC .......................................... 718/103; 718/104

(58) Field of Classification Search
USPC ......................................... 718/102, 103, 104
See application file for complete search history.

(56) References Cited

U.S. PATENT DOCUMENTS

| 6,148,300 A | 11/2000 | Singhal et al. |
| 2002/0107854 A1 | 8/2002 | Hua et al. |
| 2007/0124546 A1 | 5/2007 | Blanchard et al. |

Primary Examiner — Diem Cao
Assistant Examiner — Mehran Kamran
(74) Attorney, Agent, or Firm — Thomas E. Tyson; Gregory K. Goshorn; Greg Goshorn, P.C.

(57) ABSTRACT

Provided are techniques for providing a first lock, corresponding to a resource, in a memory that is global to a plurality of processor; spinning, by a first thread running on a first processor of the processors, at a low hardware-thread priority on the first lock such that the first processor does not yield processor cycles to a hypervisor; spinning, by a second thread running on a second processor, on a second lock in a memory local to the second processor such that the second processor is configured to yield processor cycles to the hypervisor; acquiring the lock and the corresponding resource by the first thread; and, in response to the acquiring of the lock by the first thread, spinning, by the second thread, at the low hardware-thread priority on the first lock rather than the second lock such that the second processor does not yield processor cycles to the hypervisor.

6 Claims, 4 Drawing Sheets

EFFICIENT LOCK HAND-OFF IN A SYMMETRIC MULTIPROCESSOR SYSTEM

CROSS-REFERENCES TO RELATED APPLICATIONS

The present application is a continuation and claims the benefit of the filing date of an application entitled, "Efficient Lock Hand-Off in a Symmetric Multiprocessor System" Ser. No. 13/426,293, filed Mar. 21, 2012, assigned to the assignee of the present application, and herein incorporated by reference

FIELD OF DISCLOSURE

The claimed subject matter relates generally to computer processing and, more specifically, to techniques for an efficient locking mechanism in a multiprocessor system.

SUMMARY

One technique for increasing the processing power of computing systems involves the implementation of multiple processors. Currently, many systems that support multiple processors adhere to a Non-Uniform Memory Access (NUMA) architecture in which processors are grouped on a chip with physical memory and a bus framework provides connectivity. Memory contention issues may be addressed by means of different memory lock designs. One lock technique involves processors, or threads executing on the processors, spinning on lock data stored in a memory associated with a locked location also stored in the memory. In a "krlock" implementation, processors or threads spin on a per-cpu bit either on the processor or on the processor associated with a thread.

Provided are techniques for an efficient locking mechanism for a resource in a multiprocessor system by acquiring, by a first thread running on a first processor of to plurality of processors in a multiprocessor system, as first lock, corresponding to a resource, wherein the first lock is global with respect to the plurality of processors; spinning, by a second thread running on a second processor of the plurality of processors, at a low hardware-thread priority on the first lock such that the second processor does not yield processor cycles to a hypervisor; spinning, by as third thread running on a third processor of the plurality of processors, on a second lock in a memory local to the third processor such that the third processor is configured to yield processor cycles to the hypervisor; acquiring the first lock and the corresponding resource by the second thread; and, in response to the acquiring of the first lock by the second thread, spinning, by the third thread, at the low hardware-thread priority on the first lock rather than the second lock such that the third processor does not yield processor cycles to the hypervisor.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following, detailed description of the disclosed embodiments is considered in conjunction with the following figures, in which:

DETAILED DESCRIPTION

Figure 1:
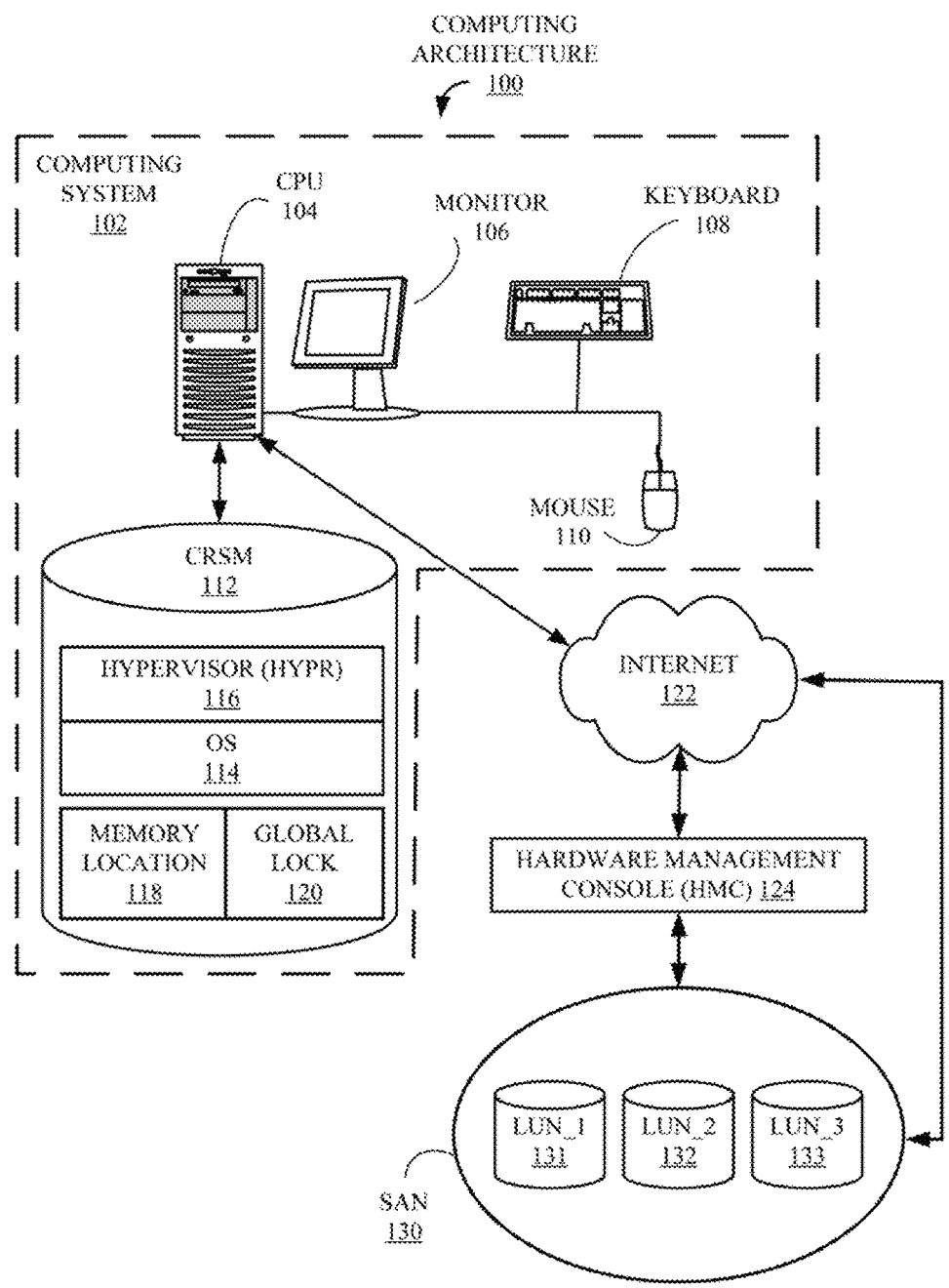
FIG. 1 is an example of a computing system architecture that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As explained above, many multiprocessor systems adhere to a Non-Uniform Memory Access (NUMA) architecture and memory contention issues may be addressed with memory lock designs such as having processors or threads, or "contenders," spin on lock data in a memory associated with a locked location that is also stored in the memory. Alternatively, in a "krlock" implementation, contenders may spin on a per-cpu bit in a cache on the processor associated with the corresponding contender. Applications running on such memory lock systems may incur a large amount of remote memory access latency depending upon where threads are running in the system. For example, threads using lock mechanisms may experience fairness issues, data starvation and so on depending upon where the lock data is stored within the NUMA topology. One issue is that lock data may be local to one processor or thread and remote to another, thus providing the local processor an advantage at securing the lock.

Applications running a krlock implementation may have a first contender for a lock spin on a corresponding memory lock and other contenders, including remote contenders spinning on a per-cpu bit, thus potentially avoiding remote memory access Once the lock owner releases the lock, the lock is acquired by the first contender. Now the first contender becomes the owner of the lock and the second contender starts the slow spin on the memory lock, delaying the yielding the processor cycles to the hypervisor. All other contenders are still spinning on their respective per-cpu bits. This process cascades as the lock is acquired and released by each of the contenders. One issue that arises in such a system is maintaining consistency among the memory lock and the per-cpu locks.

With the development of the hypervisor, another issue that arises in conjunction with current locking techniques is that the hypervisor may manage processor idle cycles with respect to different workloads and logical partitions to implement power saving policies. When a lock owner releases a memory lock to the first contender, who may have yielded processor cycles to the hypervisor due to power saving policies and therefore needs to be nudged to get it running to acquire the lock, the operation may take longer than necessary to complete. For example, a lock contender may spin on a lock for a limited amount of time and then yield the CPU to the hypervisor until awoken when the lock is available. This can increase the lock-hold latency for other contenders, thus potentially generating data starvation issues.

FIG. 1 is a computing architecture 100 on which the disclosed subject matter may be implemented. A computing system 102 includes a central processing unit (CPU) 104, coupled to a monitor 106, a keyboard 108 and a pointing device, or "mouse," 110, which together facilitate human interaction with components of computing system architecture 100 and computing system 102. Also included in computing system 102 and attached to CPU 104 is a computer-readable storage medium (CRSM) 112, which may either dynamic or non-dynamic memory and incorporated into computing system 102 i.e. an internal device, or attached externally to CPU 104 by means of various, commonly available connection devices such as but not limited to, a universal serial bus (USB) port (not shown).

CRSM 112 is illustrated storing an operating system (OS) 114, a hypervisor (HYPR) 116, a memory location 118 and a global lock 120, associated with memory location 118 and implemented in accordance with the disclosed technology. The interaction among OS 114, HYPR 118, memory location 118 and global lock 120 is explained in more detail below in conjunction with FIGS. 2-3.

Computing system 102 is connected to the Internet 122, which is also connected to a hardware management console (HMC) 124. Although in this example, computing system 102 and HMC 124 are communicatively coupled via the Internet 122, they could also be coupled through any number of communication mediums such as, but not limited to, a local area network (LAN) and a wide area network (WAN). HMC 124 enables an administrator to configure and control the various elements of computing architecture 100, including, but not limited to, computing system 102, HYPR 116 and a storage area network (SAN) 130. SAN 130 is illustrated as containing three storage devices, or logical units, i.e. a LUN__1 131, a LUN__2 132 and a LUN__3 133. It should be noted there are many possible computing system configurations, of which computing system architecture 100 is only one simple example employed throughout the Specification as an example of one system that may implement the claimed subject matter.

Figure 2:
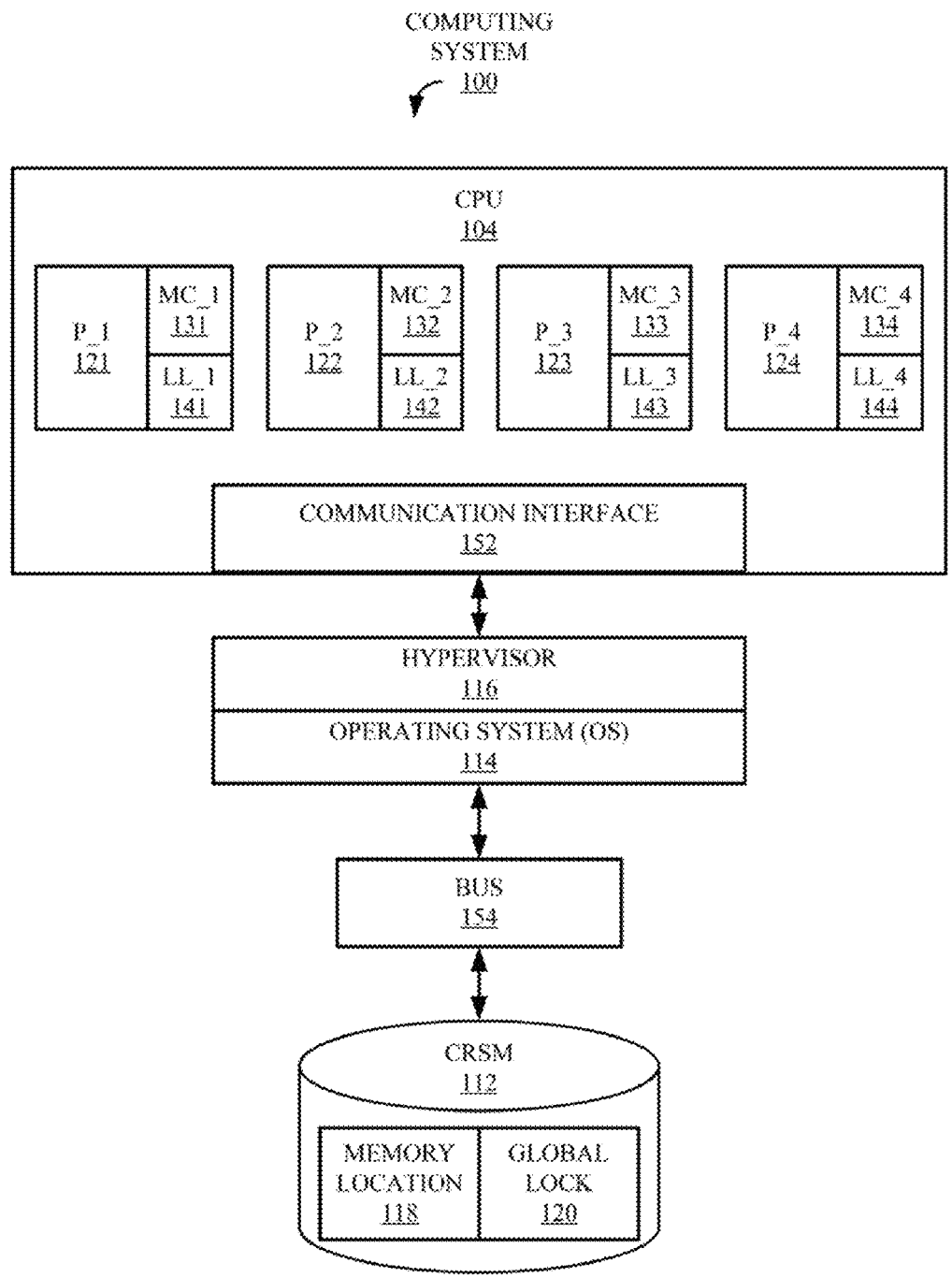
FIG. 2 is a block diagram showing elements of FIG. 1 in more detail.

FIG. 2 is a block diagram showing elements of FIG. 1 in more detail. Included from FIG. 1 are CPU 104, CRSM 112, OS 114, HYPR 116, memory location 118 and global lock 120. Also illustrated are several processors associated with CPU 104, i.e. a processor__1, or "P__1," 121, a processor__2 or "P__2," 122, a processor__3, or "P__3," 123 and a processor__4, "P__4," 124. Each of processors 121-124 are coupled to a memory cache, i.e. a MC__1 131, a MC__2 132, a MC__3 133 and a MC__4 134, respectively. Each processor 121-124 and memory cache 131-134 is also associated with a local lock, i.e., a LL__1 141, a LL__2 142, a LL__3 143 and a LL__4 144, respectively. Local locks 141-144 control access by the corresponding processor 121-124 to the corresponding memory cache 131-134.

A communication interface 152 handles communication between CPU 104 and both OS 114 and HYPR 116. A communication bus 154 provides a path for signals to be transmitted among CPU 104, processors 121-124, communication interface 152, OS 114, HYPR 116 and CRSM 112. The interactions among processors 121-124 memory caches 131-134, local locks 141-144 memory location 118 and global lock 129 are explained in more detail below in conjunction with FIGS. 3 and 4.

Figure 3:
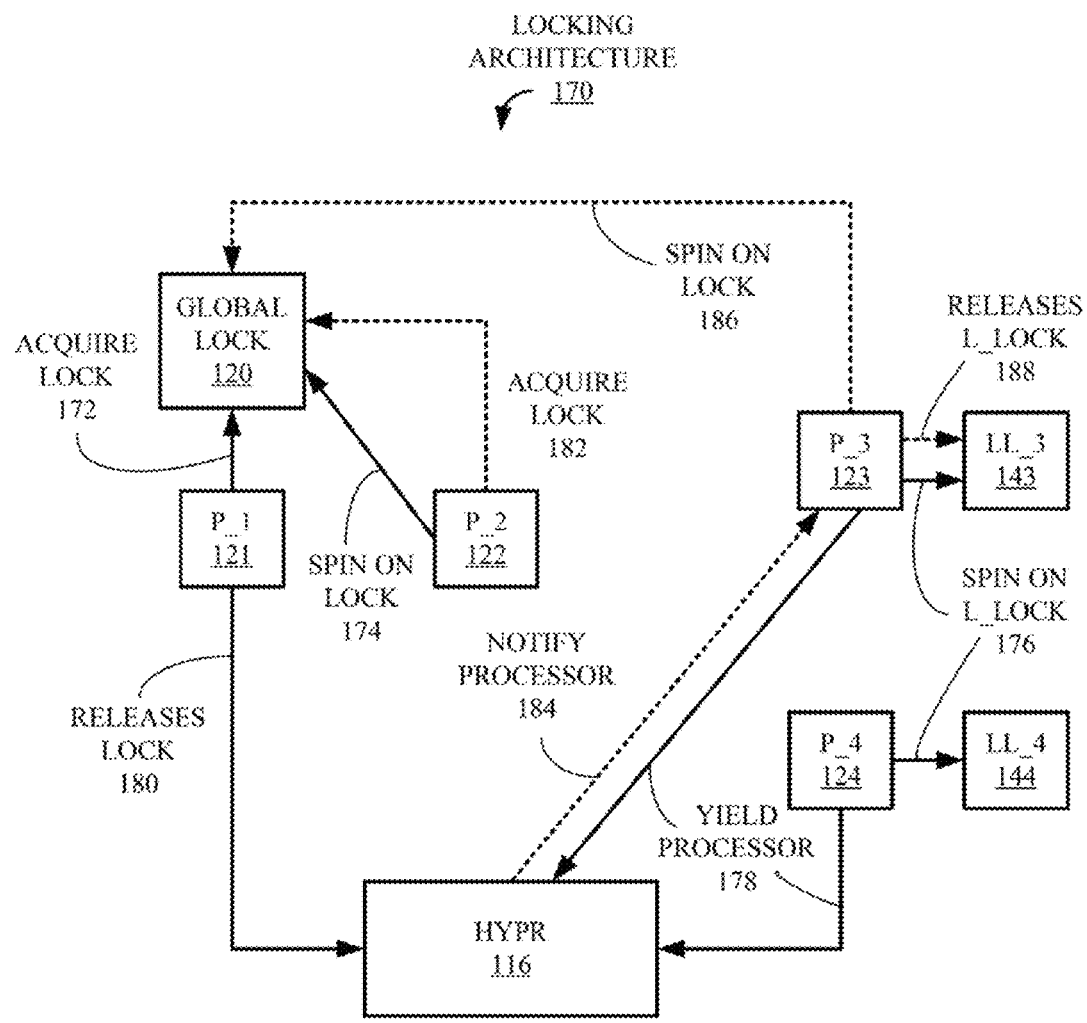
FIG. 3 is a block diagram of a locking architecture in accordance with the claimed subject matter.

FIG. 3 is a block diagram of a locking architecture 170 in accordance with the claimed subject matter. FIG. 3 includes HYPR 116, global lock 120, P__1 121, P__2 122, P__3 123, P__4 124, LL__3 143 and LL__4 144, each of which is described above in conjunction with one or both of FIGS. 1 and 2.

Also included in FIG. 3 are actions related to the claimed subject matter. P__1 121 acquires 172 global lock 129. When P__2 122 attempts to acquire global lock 120, P__2 122 determines the lock is in the possession of P__1 121 and spins 174 on global lock 120. When P__3 123 and P__4 124 attempt to acquire global lock 120. P__2 123 and P__4 124 determine that P__1 121 is in possession of and P__2 is waiting for global lock 120. In response, P__3 123 and P__4 124 spin 176 on local locks, LL__3 143 and LL__4 144, respectively. It should be noted that a processor spinning on global lock 120 does not yield processor cycles to HYPR 116 but that processors spinning on local locks do as illustrated by Yield Processor 178.

P__1 121 releases 180 global lock 120, notifying HYPR 116. Each action subsequent to P__1 121 releasing 180 global lock 120 is illustrated with a dotted line. P__2 122 detects that global lock 120 has been released and acquires 182 global lock 120, thereby acquiring access to the corresponding resource. HYPR 116 notifies 184 the first contender for global lock 120, which in this example is P__3 123. P__3 123 then spins 186 on global lock 120 and releases 188 LL__3 143. Although not illustrated, P__4 124 then becomes the first contender for global lock 120.

Figure 4:
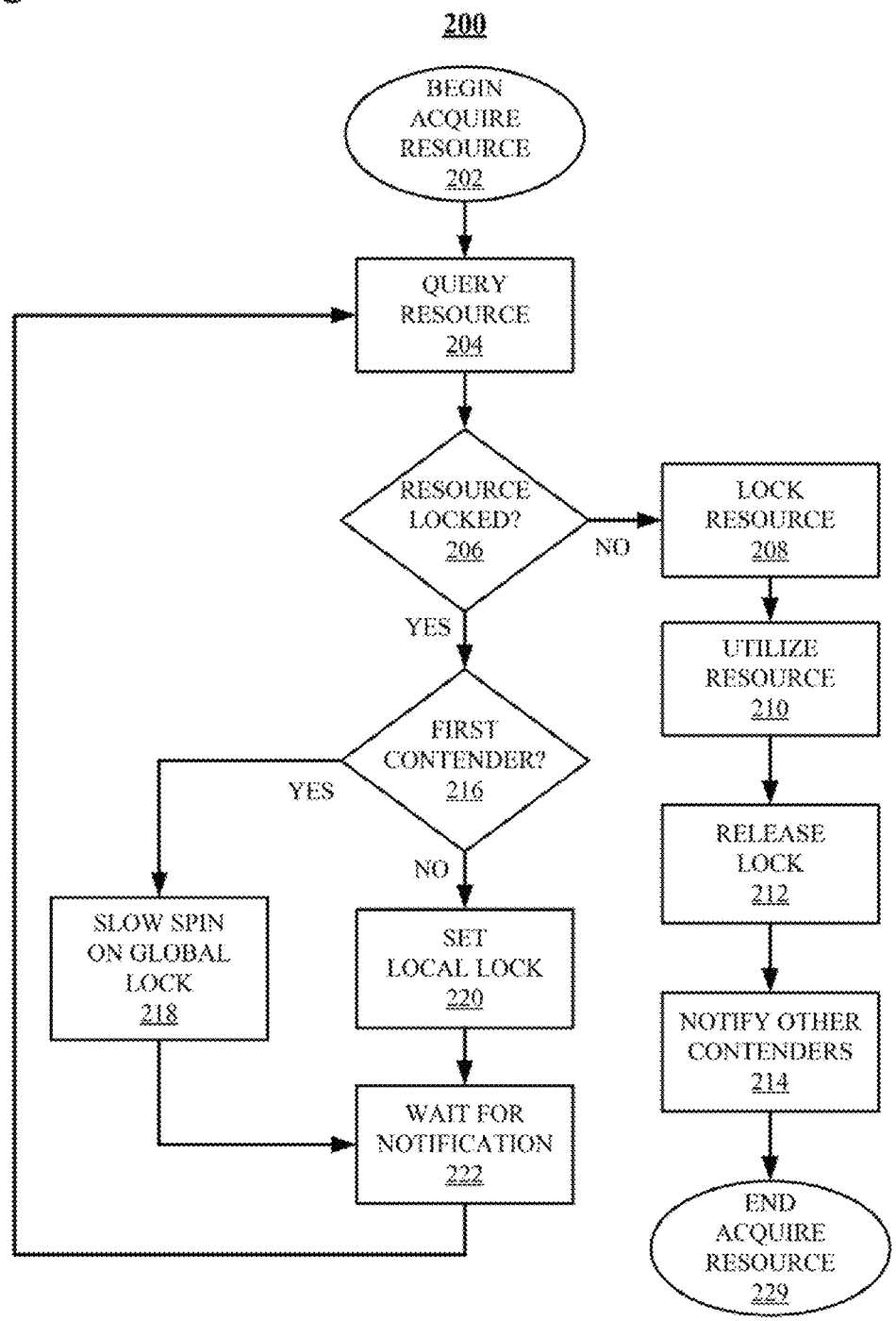
FIG. 4 is a flowchart illustrating one example of an Acquire Resource process that may implement the claimed subject matter.

FIG. 4 is a flowchart illustrating one example of an Acquire Resource process 200 that may implement the claimed subject matter. In this example, logic associated with process 200 is stored on CRSM 112 (FIGS. 1 and 2) and executed on one or more processors 121-124 (FIG. 2) of CPU 104 (FIGS. 1 and 2) of computing system 102 (FIGS. 1 and 2). Although described in conjunction with the acquisition of a memory resource such as memory location 118 (FIGS. 1 and 2), the disclosed technology is equally applicable to other resources such as, but not limited to, memory associated with SAN 130 (FIG. 1), LUNs 131-133 (FIG. 1) and devices such as printers (not shown), communication devices (not shown) and servers (not shown).

Process 200 starts in a "Begin Acquire Resource" block 202 and proceeds immediately to a "Query Resource" block 204. During processing associated with block 204, a query is made as to the status of a requested resource, specifically as to whether or not the resource is currently available. During processing associated with a "Resource Locked?" block 206, a determination is made as to whether or not the resource queried during processing associated with block 204, or the "requested resource," has been locked by another process or thread of a process. Typically, each resource is associated with a lock and if the lock is not currently set the resource is available.

If the requested resource is not locked, control proceeds to a "Lock. Resource" block 208. During processing associated with block 208, a lock corresponding to the resource is set. In the following example, the requested resource is memory location 118 and the corresponding, lock is global lock 120. During processing associated with a "Utilize Resource" block 210, the requested resource is used by the process or thread that initiated process 200. Once the use has completed, during processing associated with a "Release Lock" block 212, the process or thread that locked the requested resource during processing associated with 208, releases global lock 120. During processing associated with a Notify Other Contenders" block 214, each processes or thread that is waiting on the requested resource is notified that global lock 120 has been released.

If, during processing associated with block 206, a determination is made that the requested resource is locked, control proceeds to a "First Contender?" block 216. During processing associated with block 216, a determination is made as to whether the process or thread that queried the resource during processing associated with block 204 is the first contender for the requested resource. In other words, a queue is established if more than one device or thread is waiting to use the same requested resource so that requesting process or thread may know how many other processes or threads are waiting for a particular resource. If the process or thread that requested the resource is determined to be the first contender, control proceeds to a "Slow Spin on Global Lock" block 218; if not, control proceeds to a "Set Local Lock" block 220.

During processing associated with block 218, the requesting process or thread enters a slow spin on global lock 120. One result of a slow spin is that such a process is not put to sleep by the OS 114 (FIGS. 1 and 2) or HYPR 116 (FIGS. 1 and 2) enabling the process or thread to resume execution more quickly than if the process or thread was paused. In other words, a slow spin delays the yielding of processing cycles to HYPR 116. Processes or threads that are not the first contender rely upon the corresponding local lock 141-144 and may be paused or put to sleep, typically taking longer to resume once the local lock 141-144. In this manner, the requested resource is accessed more quickly and thereby improving resource efficiency while still conserving power.

During processing associated with block 220, a local lock corresponding to the resource is set. In this example, the local lock that is set would be associated with one of local locks 141-144 (FIG. 2) depending upon which processor 121-124 is executing the processes of thread that requested the resource queried during processing associated with block 204.

During processing associated with as "Wait for Notification" block 222, the requesting process or thread waits tear a notification of a release of global lock (see 214), either in a slow spin if the process or thread is the first contender or potentially paused or in a sleep mode if not (see FIG. 3). Control then proceeds to Query Resource block 204 and processing continues as described above.

Once a requesting process or device has acquired global lock 120, utilized the requested resource, released global lock 120 and notified other contenders during processing associated with blocks 208, 210, 212 and 214, respectively, control proceeds to an "End Acquire Resource" block 229 during which process 200 is complete.

The terminology used herein is for the purpose of describing particular embodiments only and is not intended to be limiting of the invention. As used herein, the singular forms "a", "an" and the are intended, to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart, or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
   acquiring, by a first thread running on a first processor of a plurality of processors in a multiprocessor system, a first lock corresponding to a resource, wherein the first lock is global with respect to the plurality of processors;
   spinning, by a second thread running on a second processor of the plurality of processors, at a low hardware-thread priority on the first lock such that the second processor does not yield processor cycles to a hypervisor that implements power-saving policies;
   spinning, by a third thread running on a third processor of the plurality of processors, on a second local lock on a unshared memory local to the third processor such that the third processor is configured to yield processor cycles to the hypervisor, wherein the second local lock is a per CPU bit associated with the third processor;
   acquiring the first lock and the corresponding resource by the second thread; and
   in response to the acquiring of the first lock by the second thread, after notification by the hypervisor, spinning, by the third thread, at the low hardware-thread priority on the first lock rather than the second local lock such that the third processor does not yield processor cycles to the hypervisor.

2. The method of claim 1, further comprising, in response to the acquiring of the first lock by the second thread, notifying the third processor of the acquiring.

3. The method of claim 1, further comprising, in response to the acquiring of the first lock by the second thread, utilizing the resource by the second thread.

4. The method of claim 1, further comprising:
   spinning, by a fourth thread running on a fourth processor of the plurality of processors, on a third lock in a memory local to the forth processor such that the fourth processor is configured to yield processor cycles to the hypervisor; and
   in response to the acquiring of the first lock by the second thread and a subsequent acquiring of the first lock by the third thread, spinning, by the fourth thread, at the low hardware-thread priority on the first lock rather than third lock such that the fourth processor does not yield processor cycles to the hypervisor.

5. The method of claim 4, wherein the third lock is a per-cpu bit associated with the fourth processor.

6. The method of claim 4, further comprising, in response to the acquiring of the first lock by the third thread, notifying the fourth processor of the acquiring.

* * * * *